Patented Aug. 12, 1930

1,772,975

UNITED STATES PATENT OFFICE

HERMANN WIELAND, OF HEIDELBERG-ON-THE-NECKAR, GERMANY, ASSIGNOR TO THE FIRM C. H. BOEHRINGER SOHN, CHEMISCHE FABRIK, OF NIEDER-JUGELHEIM-ON-THE-RHINE, GERMANY

PROCESS FOR THE PRODUCTION OF ANTISEPTIC AGENTS

No Drawing. Application filed June 14, 1926, Serial No. 116,013, and in Germany June 20, 1925.

This invention relates to a process for producing antiseptic agents. It is known that lactic acid is capable of counteracting the development of harmful bacteria, in particular those which thrive advantageously on alkaline nutrient materials, whereas it does not inhibit the development of the frequently desirable lactic acid bacteria.

The invention resides in bringing the lactic acid to a desired hydrogen-ion concentration specially suited to the particular purpose in mind, with the aid of salts, in particular lactic acid salts. This may, for example, be effected by the addition in suitable quantity of, for example, an alkali- or alkaline earth hydroxide or an alkali- or alkaline earth carbonate or bi-carbonate. Instead of producing the salts employed to bring the acid to the desired degree of dissociation by means of additions, such as, for example, caustic soda solution, it is possible, for example, to proceed by dissolving the particular salts, such as, for instance alkali lactate, in the requisite quantities in the lactic acid, or, again, by decomposing a salt of lactic acid, with the aid of a stronger acid forming an insoluble salt, to such an extent that a solution of lactate in lactic acid of the desired degree of dissociation results.

Serious objections stood, however, in the way of the carrying out of this idea, because it was not to be expected in view of the generally known presence of lactylo-lactic acid in commercial lactic acid that solutions which would remain unaltered could be obtained. It is known that commercial lactic acid generally constitutes a mixture, more or less in equilibrium, of lactic acid, lactylolactic acid and water. The lactylolactic acid content is dependent on the concentration of the acid mixture. According to our experiments, an 80 to 90 per cent commercial lactic acid contains, for example, lactylolactic acid within the limits 20 to 35 per cent. If the chemical equilibrium between lactic acid on the one hand and lactylolactic acid and water on the other hand is disturbed by alteration of the concentration, then weeks and months may go by before a condition of equilibrium is again reached.

If, therefore, for example, a solution of sodium lactate is added to a mixture, in equilibrium, of lactic acid, lactylolactic acid and water, then it is to be expected that slow decomposition of a certain quantity of lactylolactic acid will occur, whereby two carboxyl groups will replace one carboxyl group, which must result in a considerable alteration of the original concentration of hydrogen ions. The impossibility of foreseeing the entire course of the reaction is further increased, because lactylolactic acid is an acid with a degree of dissociation different from that of lactic acid, and the lactic acid combined in the condition of lactate is partially displaced, so that there is finally in solution: lactic acid, lactylolactic acid, sodium lactate and sodium lactylolactate, all partly in ionized and partly in molecular form.

Even greater displacements are to be expected theoretically if lactic acid is partially neutralized with an alkali-metal or alkaline earth metal hydroxide or an alkali-metal or alkaline earth metal carbonate, for the purpose of obtaining a particular concentration of hydrogen ions. In this case in consequence of the more considerable disturbance of the condition of equilibrium, even more lactylolactic acid is split off, so that the number of carboxyl groups is considerably increased.

Finally it was further to be feared that the hydrogen ion concentration of concentrated solutions of lactic acid and lactate would experience a rapid and too considerable alteration of the hydrogen ion concentration, whereby its employment for many purposes would become illusory, if diluted with much water, as is frequently necessary in the practical employment of such solutions, and allowed to stand.

It has been proved, however, in a surprising manner, that in carrying out the process or method of this invention, disturbances, of practical importance, in the constancy of the hydrogen-ion concentration, do not appear. It is possible, to obtain solutions which, not only on being kept for a long while, but also on being diluted with water, and moreover, even on heating such as may be necessary for example in the sterilization of the solutions, alter in their degree of hydrogen-ion concentration within such small limits only that the value, in use, of the solutions is not influenced thereby. The preparations, producible according to the invention, are adapted for antiseptic purposes, disinfection purposes, conservation purposes, and the like. They are, for instance, excellently suited for the treatment of mucous membranes, for instance, in cases of fluorine burns, as well as in cases of open, festering wounds.

For carrying out the method of this invention lactic acid may be partially neutralized by the addition of, for example, an alkali-metal or alkaline earth metal hydroxide, ammonia or an alkali-metal, alkaline earth-metal, or ammonium carbonate or bi-carbonate, or a salt of a weaker acid such as boric acid, acetic acid and the like, or mixtures of any of the above, and by diluting the solution, according to requirements, with water, or also by concentrating it in suitable manner, or, for example, by decomposing the lactic acid with a definite quantity of alkali-metal or alkaline earth metal lactate and by bringing the solution by suitable measures to the necessary concentration. Another way of carrying the method into effect consists, in partly converting a salt of lactic acid, for example, calcium lactate, with a stronger acid, for example, sulphuric acid into lactic acid and salt of the stronger acid and precipitating out, if necessary, the salt of the stronger acid, which, in the case of sulphuric acid, is calcium sulphate.

In cases in which an absolute invariability of the hydrogen-ion concentration obtained is in question it is possible to proceed by producing the solutions from a lactic acid containing comparatively little lactylolactic acid; that is to say a lactic acid of which the concentration does not, or does not considerably, exceed 50 per cent. If such an acid is brought to a particular desired hydrogen-ion concentration, for example, by neutralizing a part thereof or by the action of sodium lactate solution a solution having a stable pH value is obtained. In treating concentrated lactic acid, for example, by partial neutralization or by the addition of sodium lactate solution it is possible, for example, by heating, to arrive rapidly at the final equilibrium thereby quickly obtaining the final pH value. It has also been ascertained that an addition of solid alkali-metal or alkaline earth metal lactates into lactic acid does not result in any subsequent alteration of the hydrogen-ion concentration.

For application in practice solutions of which the pH value is not much higher than 4.2 and not much lower than 3.0, for example, solutions of pH value of 3.2–4.2 are suitable for antiseptic purposes. For the purpose of mild selective antiseptic solutions having pH values between 3.6 and 4.2 have, amongst others, proved suitable.

The following examples illustrate how antiseptic agents of this invention can be prepared.

1. 240 grms. of 90 per cent lactic acid are treated with a solution of 50 grms. of caustic soda in 300 c. c. of water and the mixture is warmed for some time. A concentrated solution is obtained which produces a particularly selective antiseptic medium and which, on dilution with water, for example, in the proportions of 1–10, gives a pH value of 3.95. In place of the caustic soda, 66 grms. of anhydrous soda or 105 grms. of sodium bicarbonate, for example, can be used.

2. A solution of 375 grms. of calcium lactate having 5 molecules of water of crystallization, in 5 litres of water are treated with 57 grms. of concentrated sulphuric acid and the solution separated from the precipitated calcium sulphate. The solution thereby obtained shows a pH value of 3.6.

3. 800 grms. of 90 per cent lactic acid are treated with 75–100 grms. of caustic soda and the solution diluted with water to 5 litres.

Further experiments have shown that in place of or in addition to lactic acid, also other acids in the sense of the invention can be made into antiseptic agents. Especially suitable are readily soluble organic acids of high acidity such as show, for example, in a 0.1 molar solution (0.1 mol. per litre) at the most a pH value of 3.0 and better still a pH value lower than this. Suitable acids apart from lactic acid which can be used when carrying the invention into effect are other oxy-acids such as tartaric acid, citric acid or the like; acetic acid and its homologues; dibasic saturated or unsaturated acids such as oxalic acid, malic acid and the like; oxy-acids such as pyroracemic acid and the like. Amino acids which can be brought to a suitable hydrogenion concentration by the addition of inorganic or strong organic acids have also been shown to be suitable.

For the production of antiseptic agents from acids of the above mentioned kind the treatments described in Examples 1 to 3 for lactic acid can be employed using the requisite quantity of materials.

4. 84 grms. of citric acid are brought into solution in 1 litre of water and a solution of 32 grms. of caustic soda in 1 litre of water is added thereto. To this solution one and a half litres of hydrochloric acid is added. The solution then shows a pH value of 3.0.

It has, moreover, been proved advantageous to combine the antiseptic agents, producible in accordance with the invention, with other inorganic or organic antiseptic agents, such as heavy metal salts, for instance silver or mercury salts, fluorides or the like, phenols, cresols, colouring matters having antiseptic properties and the like. In this manner on the one hand combined antiseptic actions or those of increased intensity can be obtained, while on the other hand these combinations are especially valuable in cases in which the action of the additional antiseptic agents such as heavy metal salts are favoured by the presence of an acid medium.

5. 5 grms. of mercuric oxide are dissolved in 300 c. c. of 90 per cent lactic acid which is diluted with 500 c. c. of water. A solution of 72 grms. of caustic soda in 200 c. c. of water is then added thereto.

6. 30 grms. of silver carbonate are suspended in 5 litres of water and 3.6 kgs. of 90 per cent lactic acid are added. After all of the silver carbonate has gone into solution a part of the lactic acid is neutralized by the addition of 2 litres of 20 per cent caustic soda solution.

In some cases it is advantageous to add to the antiseptic agents producible in accordance with this invention, other substances. As such come under consideration, for example, nutrient materials used in bacteriological operations such as albuminous substances, peptone and the like; carbohydrates such as glycogen, milk sugar or glucose; also odoriferous substances such as oil of neroli, oil of pine and the like. Suspensions or cultures of lactic acid bacteria may also be employed as additions in some cases. The agents can, for example, be incorporated in liquid form, if necessary in capsule form, or, for instance, in semi-solid form, for example, as a gelatine-gel, or, they can be produced as a thick paste, or again, dried on an indifferent powder such as bolus and the like.

The production of the antiseptic agents in semi-solid form can be obtained for instance by dissolving an appropriate quantity of gelatine in a little warm water and stirring in thoroughly an equally warm solution of the disinfecting means.

7. 20 grms. of gelatine are dissolved in 20 cc. of water under heat. To the solution an equally warm solution of 32 grms. of 80 per cent lactic acid, containing 15 grms. of calcium lactate is added with frequent stirring. 50 grms. of glycerine can also be added with advantage. The fluid mass solidifies in a short time.

The gelatine-gels produced in this manner exhibit excellent stability and durability.

Even in the presence of large quantities of salts it is found in a surprising manner that flocculation, which is to be feared, does not take place. Furthermore a liquefaction of the gel by hydrolysis does not occur during storage.

The invention offers the advantage that it is possible to bring the lactic acid to any desired hydrogen-ion concentration. Since the hydrogen-ion concentration remains practically independent of the degrees of dilution it is possible to apply the agents when using the most varied concentrations.

The antiseptic agents according to the invention are also especially suitable in such cases where during application, a dilution of the same occurs. In such cases, by the application of concentrated solutions, a prolonged action and the maintenance of a practically even pH value can be obtained.

Claims:

1. Antiseptic agents consisting of lactic acid and salt of lactic acid in such quantities that the hydrogen-ion concentration of the solution of the mixture lies approximately between the pH values of 3.0 and 4.0.

2. As antiseptic agent an aqueous solution comprising lactic acid and a salt of lactic acid in such concentrations and relative proportions that the aqueous solution possesses a hydrogen ion concentration which does not fall substantially below a pH value of about 4.2 and does not rise substantially above a pH value of about 3.0.

3. As antiseptic agent, an aqueous solution comprising an organic acid having a hydrogen ion concentration in a molar solution not less than that represented by a pH value of 3.0 and a salt of the said organic acid, which solution possesses a hydrogen ion concentration which does not fall substantially below a pH value of about 4.2 and does not rise substantially above a pH value of about 3.0.

4. As antiseptic agent, an aqueous solution comprising an organic acid having a hydrogen ion concentration in a 0.1 molar solution not less than that represented by a pH value of 3.0 and a salt of the said organic acid, which solution possesses a hydrogen ion concentration which lies between the pH values of about 3.0 and about 4.2.

5. As antiseptic agent an aqueous solution consisting of lactic acid, a salt of lactic acid, at least one other acid and a salt of the other acid in such concentrations and relative proportions that the aqueous solution possesses a hydrogen ion concentration which does not fall substantially below a pH value of about 4.2 and does not rise substantially above a pH value of about 3.0.

6. As antiseptic agent an aqueous solution comprising lactic acid and a salt of lactic acid in such concentrations and relative proportions that the aqueous solution possesses a hydrogen ion concentration which does not fall substantially below a pH value of about 4.2 and does not rise substantially above a pH value of about 3.0, and at least one other disinfectant which is effective in an acidic medium.

7. As antiseptic agent an aqueous solution comprising lactic acid and a salt of lactic acid in such concentrations and relative proportions that the aqueous solution possesses a hydrogen ion concentration which does not fall substantially below a pH value of about 4.2 and does not rise substantially above a pH value of about 3.0, and at least one additional nutrient material for bacteria.

In testimony whereof I affix my signature.
HERMANN WIELAND.